July 27, 1965     P. T. RICHARDS     3,196,552
CARPENTER'S LEVEL WITH ELECTRICAL INDICATION
Filed Nov. 19, 1962
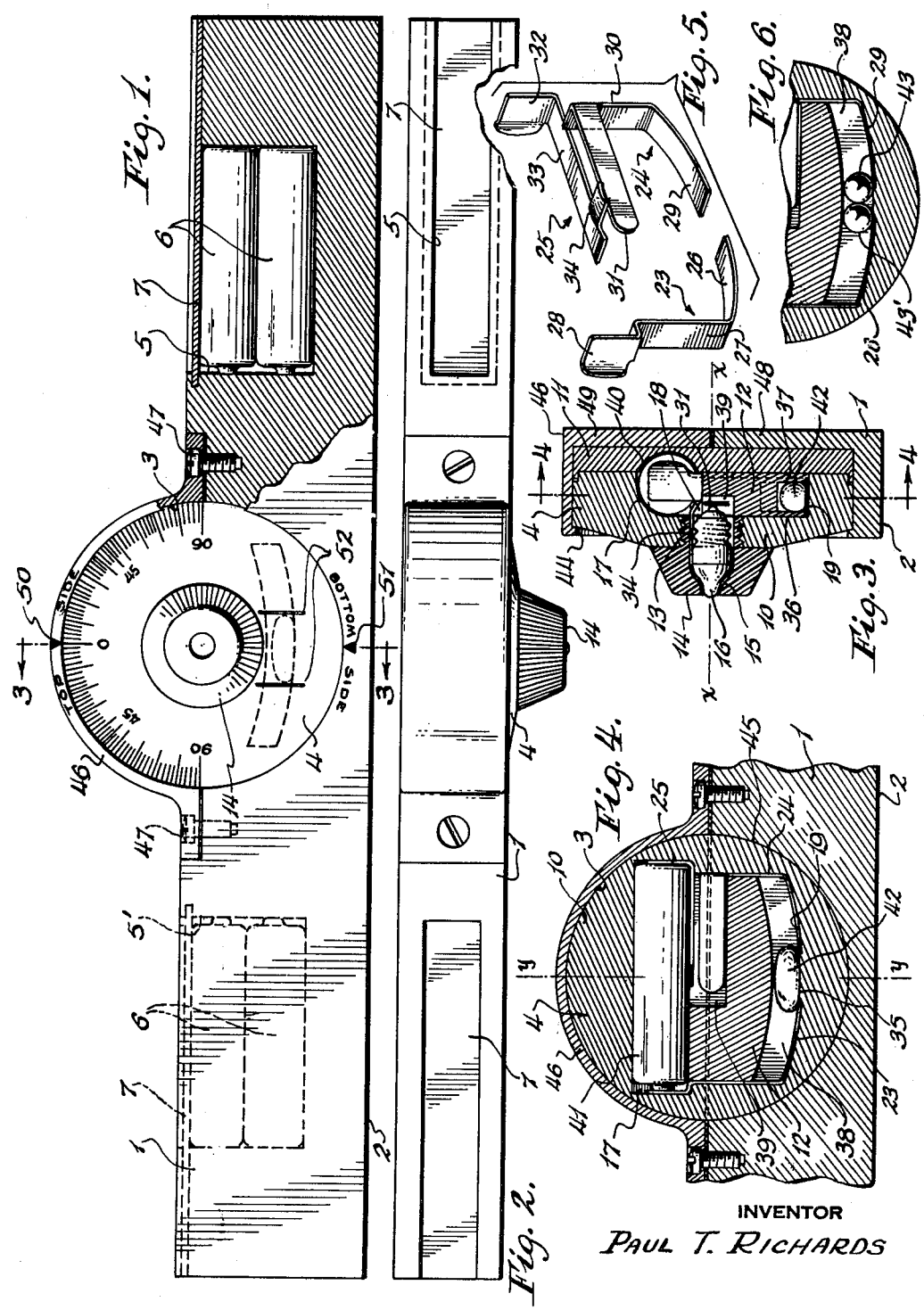
INVENTOR
*Paul T. Richards*

United States Patent Office 3,196,552
Patented July 27, 1965

3,196,552
CARPENTER'S LEVEL WITH ELECTRICAL
INDICATION
Paul T. Richards, 105 Susan Cove, East Norwich, N.Y.
Filed Nov. 19, 1962, Ser. No. 238,494
5 Claims. (Cl. 33—214)

This invention relates generally to level indicating devices and, more particularly, to carpenters' levels commonly used to determine the angular orientation of an object with respect to the horizontal or gravity vertical. Specifically, the invention is directed to a carpenter's level wherein an indication is provided by an electrical illuminating means energized when the object is in the desired orientation.

In the use of a carpenter's level, there often arises situations wherein the user thereof cannot directly view the spirit level or bubble of a conventional level so that an accurate indication of the orientation of an object with respect to the horizontal or gravity vertical cannot be determined; for example, when working in poor ambient light conditions or when the object being oriented is so high or so low or otherwise so located that direct viewing thereof is very difficult or even impossible.

While electrically operated levels have been proposed in the past, they have been very complex and hence have tended to be unreliable and very costly to manufacture, primarily because of the electrical complexities of connecting the illuminating device and level-sensing switch means with a source of electrical current. This has been especially true wherein, as is desired, the level-sensing switch device is made angularly adjustable with respect to a reference plane or surface of the main body of the level so that objects may be oriented to any angular position with respect to the horizontal. In this latter case, difficulties arise from the use of sliding contacts, sliprings or other relatively movable electrical contacts.

By means of the present invention, the foregoing difficulties and disadvantages are overcome by including within an integral housing all of the necessary electrical level-sensing and indicating elements and then adjustably securing this housing within a suitable opening in the main body of the level. Preferably, the housing is cylindrical in shape and is angularly adjustably clamped within a corresponding cylindrical opening in the body of the level.

It is, therefore, the primary object of the present invention to provide an electrically indicating carpenter's level wherein all of the electrical elements required for such electrical indication are self-contained in a housing which, in turn, is adjustably secured within a corresponding opening in the main body portion of the level.

It is a further object of the invention to provide an electrically indicating carpenter's level wherein an electric switch device is closed when the level is in the desired orientation and an electrical circuit is thereby completed between a lamp and battery; the switch, lamp, conductors and battery all being self-contained within a cylindrical housing, which housing is in turn adjustably positioned in a corresponding opening in the main body portion of the level whereby no sliding or other movable contacts are required between the level-sensing element, the switch and power supply.

Other objects and advantages not hereinabove specifically enumerated will become apparent as the description of a preferred embodiment of the present invention proceeds, reference being made to the accompanying drawings, wherein:

FIG. 1 is a front elevational view of the carpenter's level constructed in accordance with the teachings of the present invention;

FIG. 2 is a top elevational view thereof;

FIG. 3 is a vertical sectional view of a portion of the level taken at line 3—3 of FIG. 1;

FIG. 4 is a vertical sectional view taken at line 4—4 of FIG. 3;

FIG. 5 is a perspective view of the electrical conductor elements of the invention; and FIG. 6 is a partial sectional view of a modification of the level-sensing switch portion of the level.

Referring now to FIG. 1, the carpenter's level comprises generally a main body portion or base member 1, which may be of conventional carpenter's level form, i.e., an elongated beam of rectangular cross-section, and which may be fabricated from any suitable rigid material such as plastic, wood, metal, etc. It should be noted that the original patent drawings are drawn to a substantially 1:1 scale. The body portion 1 is provided with a flat planar reference surface 2 which is adapted to be placed against an object, the orientation of which with respect to the horizontal (or gravity vertical) is to be determined or to which the object is to be adjusted. Preferably, centrally located in the body portion 1 is a cylindrical opening 3 having angularly adjustably secured therein a corresponding cylindrical housing or assembly 4 embodying all of the necessary level-sensing and indicating elements of the level, as will be hereinafter more fully described. The body portion 1 may also include rectangular receptacles 5 and 5' on either side of the opening 3 for the storage of spare dry cells or batteries 6. The receptacles may be closed with sliding covers 7 mounted in suitable slots in the body portion 1 and maintained in place by frictional engagement with the slots.

As stated, and in accordance with the teachings of the present invention, the housing 4 embodies all of the necessary level-sensing, indicating, conducting, and power supply elements of the level, whereby all sliding contacts or other relatively movable electrical connections are eliminated thereby increasing the level's reliability and also decreasing considerably its manufacturing costs. The housing 4 is comprised of several separate basic portions or parts which are integrated into a unitary structure; a front cylindrical portion 10, a rear cylindrical portion 11, and a generally rectangular insert portion 12. The housing 4 has two major axes x—x and y—y; the x—x axis which is normally horizontal and about which the housing is rotatably adjusted in the body portion 1 of the level, and the y—y axis which is normally vertical and is the sensitive or reference axis of the housing as will become apparent. The front portion 10 includes a central tapped aperture 13 into which is tightly screwed a knob 14 by which the entire housing may thereafter be rotated within the body opening 3. The knob 14 is provided with a central cavity 15 adapted to receive an electric light means, such as a standard "pen light" bulb or lamp 16. The knob 14 may be unscrewed from the front portion 10 so that the bulb 16 may be conveniently replaced if necessary. Also the knob 14 may be fabricated of a suitably colored clear plastic so that it glows when the bulb 16 is energized.

The front portion 10 of housing 4 is provided with a partial cylindrical cavity 17 at the rear thereof of a size adapted to receive a standard "pen light" dry cell or battery means 41 and preferably extending at right angles to the vertical axis y—y. The front portion 10 is also provided with a generally rectangular opening 18 extending below the cylindrical opening 17 and having a lower arcuate surface 19. As shown in FIG. 4, the surface 19 has a slight downward curvature.

Three conductor elements 23, 24 and 25, are so shaped, as shown in FIG. 5, as to lie generally along the internal edge surfaces of the opening 18. Conductor 23 has a curved lower portion 26 adapted to lie along the curved bottom surface 19, a vertical portion 27 adapted to lie within and along the left side of the opening (as viewed in FIG. 4), and a top portion 28 which is adapted to extend upwardly and into the left end of cylindrical opening 17 of the front portion 10 for contact with one end of the battery 41. The conductor 24 comprises a similar arcuate lower portion 29 adapted to lie along the curved bottom surface 19, a vertically extending portion 30 adapted to lie along the right-hand wall of the opening 18 (as viewed in FIG. 4), and a finger or extension 31 extending laterally into the opening 18 to a point adjacent the central opening 13 of the front portion 10, at which point it may be contacted by one of the base contacts of the lamp 16. The conductor 25 includes a vertically extending portion 32 adapted to lie within the other or right-hand end of the cylindrical opening 17 (as viewed in FIG. 4) and in contact with the other end of battery 41, and a portion 33 extending laterally within the opening 18 to a position adjacent the central opening 13 of the front portion 10. A projection 34 extends forwardly of the portion 33 and into the opening 15 in the knob 14 to contact the other of the base contacts of the bulb 16.

Referring to FIG. 4, it will be noted that the lower portion or bottom surface 19 is provided with a central ridge 35 of a thickness equal to the thickness of the curved conductor portions 26 and 29 whereby to provide a smooth uninterrupted arcuate surface.

The insert portion 12 conforms generally to the shape of the lower opening 18 in front portion 10 and serves to clamp or secure the conductor elements 23 and 24 in place. It will be noted that at the bottom of insert 12 there are provided flanges 36 and 37 having dimensions such as to closely fit the bottom surface 19 and serve to maintain lower portions 26 and 29 of conductors 23 and 24, respectively, accurately in position and, at the same time, to define an elongated arcuate cavity 38 within the cylindrical housing 4. The parts 10, 11 and 12 are so shaped that when assembled the arcuate cavity 38 extends symmetrically to either side of the vertical axis y—y with the lowermost point of the cavity coincident with this axis. The upper side of insert 12 is provided with a cut-out 39 which provides a channel for extension 31 of conductor 24.

The rear disc-shaped portion 11 is provided with a partial cylindrical cut-out 40 adjacent partial cylindrical cut-out 17 in the front portion 10 and serves to provide a back cover for the housing 4 and, at the same time, maintain battery 41, conductors 23, 24 and 25, and insert 12 rigidly in place.

Within the arcuate cavity 38, there is contained an electrically conducting gravity-responsive means free to move therewithin. Such means may be a globule 42 of electrically conducting fluid material such as, for example, mercury. The size of the gravity-responsive means or amount of mercury contained in the cavity 38 is determined by the distance between the ends of arcuate conductors 26 and 29 such that, when the globule rests precisely at the center of the cavity 38, i.e., the vertical axis y—y of housing 4 is aligned with the gravity vertical, it will just make contact with the ends of the conductors 26 and 29. It is therefore seen that the conductors 26 and 29 together with the globule of mercury 42 constitute a gravity-responsive switch which is closed only when it is level, i.e., when the vertical axis y—y of the housing 4 coincides with the gravity vertical to thereby complete an electrical circuit between the battery 41 and light bulb 16.

An alternative form of gravity-responsive means is illustrated in FIG. 6 and comprises a pair of balls 43, 43' having diameters such that when they lie precisely at the center of the cavity 38 electrical contact is made between the balls and the respective ends of conductors 26 and 29.

The cylindrical opening 3 in the main body 1 is defined by a lower semicircular cut-out 45 and an upper semicircular, flanged rim 46 which may extend above the body portion 1 and is secured thereto by suitable fastening means such as screws 47. It will be noted that the rearward portion of the cylindrical opening 3 may be closed as by means of a back wall 48 and that, similarly, the rim 5 may be closed by back wall 49 although such walls are not necessary. Also an annular bead 44 on the forward lip of the opening 3 serves securely to hold the housing 4 in place. Around the upper periphery of the housing 4 is a suitable ±90° protractor scale having its zero reference calibration aligned with axis y—y and which may be read against an upper reference mark 50 labeled "top side" or a lower reference mark 51 labeled "bottom side." If the level is to be placed on the upper side of the object, the orientation of which is to be determined or to which it is desired to be adjusted, the scale is read against the upper reference mark 50. However, if it is to be placed on the lower surface of the object, the housing 4 is rotated so that the scale is read against the lower reference mark 51.

It will also be noted that a small space is left between the bottom of the flanges of the rim 46 and the body 1 for the purpose of permitting adjustment of the frictional engagement between housing 4 and the body portion 1. Alternatively, a resilient gasket or washer may be included between the ring flanges and body 1.

As illustrated in FIG. 1, the gravity-responsive means of the level of the present invention may be read directly by making the front portion 10 out of a clear material such as clear plastic through which the globule of mercury 42 (or balls 43, 43') may be seen. In this case spaced, vertical reference lines 52 may be inscribed or otherwise delineated on the face of front portion 10, as shown.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. A carpenter's level providing an electrical indication comprising
 (a) a base member having upper and lower surfaces, said lower surface being flat and adapted to be held against a surface of an object the orientation of which with respect to the horizontal is to be determined,
 (b) means defining a cylindrical opening in said base member and including a semicircular lower wall in said base member and a corresponding semicircular upper wall defining portion projecting from the upper surface of said base member,
 (c) a cylindrical housing adapted to fit within said cylindrical opening in frictional engagement with the walls thereof and with full 360° angular freedom about the major axis of said cylindrical housing,
 (d) electrical level-sensing switch means, electric indicating means, battery means, and electrical conductor means connecting said switch, indicating and battery means in circuit when said housing is in a horizontal orientation, all of said electrical means being self contained in said cylindrical housing and electrically independent of said base member,
 (e) protractor scale carried by said housing and extending at least 180° around the periphery thereof, and
 (f) a pair of reference indices cooperable with said scale and located on said base member on diametrically opposite sides of said cylindrical opening whereby said lower base member surface is used for orienting an object with respect to the horizontal throughout 360°.

2. A carpenter's level adapted to provide an electrical level indication comprising (a) a base member having at least one flat surface adapted to engage a surface the orientation of which with respect to the horizontal is to be determined, said base member having a cylindrical opening therein, (b) a cylindrical housing adapted to be adjustably mounted in said base member for providing an adjustable horizontal reference therefor and having a central opening therein defined by interior walls, at least one wall portion being generally arcuate, (c) first and second electrical conductors conforming generally to said interior walls each having one end terminating in spaced relation at the mid-point of said arcuate wall portion, (d) a member conforming generally to the shape of said opening and adapted to secure said conductors in said housing opening against movement, said member together with said interior walls of said opening forming a pair of cavities, one of said cavities including said arcuate wall portion and the other of said cavities being adapted to receive an electrical dry cell, (e) a third electrical conductor, the other end of said first conductor and one end of said third conductor terminating at opposite ends of said dry cell cavity and adapted to contact the dry cell terminals, and the other ends of said second and third conductors terminating in spaced relation adjacent an interior wall portion of said opening, (f) electric indicator means having electrical contact means mounted in said interior wall portion with said contact means in electrical contact with the spaced ends of said second and third conductors, (g) freely movable, electrically conductive means in said bottom cavity adapted to close the gap between the spaced ends of said first and second conductors when said housing assumes a predetermined orientation with respect to the horizontal, and (h) means for adjustably securing said cylindrical housing in said cylindrical opening of said base member.

3. In a carpenter's level adapted to provide an electrical level indication and including a base member, the combination comprising (a) a cylindrical housing adapted to be adjustably mounted in said base member for providing an adjustable level reference and having a central opening therein defined by interior walls, a lower wall portion being generally arcuate.

(b) first and second electrical conductors conforming generally to said interior walls each having one end terminating in spaced relation adjacent the mid-point of said lower wall portion, (c) a member conforming generally to the shape of said opening and adapted to secure said conductors in said housing opening against movement, said member together with said interior walls of said opening forming a pair of cavities, one of said cavities including said lower arcuate wall portion and the other of said cavities being adapted to receive an electrical dry cell, (d) a third electrical conductor, the other end of said first conductor and one end of said third conductor terminating at opposite ends of said dry cell cavity and adapted to contact the dry cell terminals, and the other ends of said second and third conductors terminating in spaced relation adjacent a central interior wall portion of said opening, (e) an electric light bulb mounted substantially centrally in said central interior wall portion with its base conductors in electrical contact with the spaced ends of said second and third conductors, and (f) freely movable, gravity responsive electrically conductive means in said bottom cavity adapted to close the gap between the spaced ends of said first and second conductors when said housing assumes a predetermined orientation with respect to the horizontal.

4. In a carpenter's level adapted to provide an electrical level indication and including a base member, the combination comprising (a) a cylindrical housing adapted to be adjustably mounted in said base member for providing an adjustable level reference and having a central, generally rectangular opening therein defined by front, side, top and bottom walls, the bottom wall thereof being generally arcuate, (b) first and second electrically conductive strips conforming to said side and bottom walls each having one end terminating in spaced relation at the midpoint of the bottom wall, the other end of the first strip terminating adjacent the top wall of said opening, and the other end of the second strip terminating adjacent the center of the front wall of said opening, (c) a member conforming generally to the shape of said opening and adapted to secure said strips in said opening against movement, the top and bottom walls of said member together with the top and bottom walls of said opening forming top and bottom cavities, said other end of the first strip being exposed at one end of said top cavity, (d) a third strip of electrically conductive material having one end terminating at the other end of said top cavity and its other end terminating adjacent the center of said front wall, said top cavity being adapted to receive an electric dry cell in electrical contact with the ends of said first and third conductive strips, (e) an electric light bulb mounted substantially centrally in said front wall with its base conductors in electrically conducting contact with the free ends of said second and third strips, (f) freely movable, electrically conductive means in said bottom cavity of a size sufficient to just bridge the gap between the spaced ends of said first and second strips, and (g) means defining a back wall for closing said cavities.

5. In a carpenter's level adapted to provide an electrical level indication and including a base member, the combination comprising (a) a cylindrical housing adapted to be adjustably mounted in said base member for providing an adjustable level reference and having a central opening therein defined by upper, lower, front and side interior walls, (b) a member conforming generally to the shape of the interior walls of said central housing opening and together with said interior walls thereof forming upper and lower cavities in said housing, (c) first and second electrical conductors conforming generally to the shape of said interior side walls, said member being adapted to secure said conductors against movement in said housing opening, and each of said conductors having one end terminating in spaced relation in one of said cavities, (d) a third electrical conductor, the other end of said first conductor and one end of said third conductor terminating in spaced relation in the other of said cavities and the other ends of said second and third conductors terminating in spaced relation adjacent said front interior wall portion of said housing opening, (e) an electric light bulb mounted in said front interior wall portion with its base conductors in electrical contact with the spaced ends of said second and third conductors, and (f) gravity responsive electrically conductive means in one of said cavities adapted to connect the spaced ends of the conductors therein and said other of said cavities including an electric dry cell adapted to electrically connect the spaced ends of the conductors therein whereby when said housing assumes a predetermined orientation with respect to the horizontal, a circuit is completed between said battery and light bulb through said gravity responsive means.

References Cited by the Examiner

UNITED STATES PATENTS

| | | | |
|---|---|---|---|
| 1,393,312 | 10/21 | Perry | 200—61.52 |
| 1,955,746 | 4/34 | Inglis | 33—206.5 |
| 2,439,698 | 4/48 | Shaler | 33—214 |
| 2,590,420 | 3/52 | Lagher | 340—282 |
| 2,600,363 | 6/52 | Morris | 33—206.5 |
| 2,789,362 | 4/57 | Maroth | 33—206.52 |

FOREIGN PATENTS 148,635  7/20  Great Britain.

ISAAC LISANN, *Primary Examiner.*